(12) United States Patent
Porte et al.

(10) Patent No.: US 9,803,547 B2
(45) Date of Patent: Oct. 31, 2017

(54) AIRCRAFT NACELLE COMPRISING A DEFORMABLE CONNECTION BETWEEN AN AIR INTAKE AND A POWER PLANT

(71) Applicant: Airbus Operations (SAS), Toulouse (FR)

(72) Inventors: Alain Porte, Colomiers (FR); Franck Le Flem, Lagraulet St. Nicolas (FR)

(73) Assignee: Airbus Operations SAS, Toulouse (FR)

( * ) Notice: Subject to any disclaimer, the term of this patent is extended or adjusted under 35 U.S.C. 154(b) by 959 days.

(21) Appl. No.: 14/083,524

(22) Filed: Nov. 19, 2013

(65) Prior Publication Data

US 2014/0147268 A1 May 29, 2014

(30) Foreign Application Priority Data

Nov. 23, 2012 (FR) .................................... 12 61169

(51) Int. Cl.
*F02C 7/04* (2006.01)
*B64D 33/02* (2006.01)

(52) U.S. Cl.
CPC ................ *F02C 7/04* (2013.01); *B64D 33/02* (2013.01); *B64D 2033/0206* (2013.01); *B64D 2033/0286* (2013.01); *F05D 2250/71* (2013.01); *F05D 2250/75* (2013.01); *F05D 2260/30* (2013.01); *Y02T 50/672* (2013.01)

(58) Field of Classification Search
CPC . B64D 33/02; F02C 7/045; F02C 7/04; F02C 7/057; F02C 7/32; F05D 2220/32; F05D 2220/36; F05D 2260/30; F05D 2250/75; F05D 2250/71; F01D 25/24; F01D 25/243; Y02T 50/672

USPC ................. 248/557, 562, 566, 615, 636
See application file for complete search history.

(56) References Cited

U.S. PATENT DOCUMENTS

| 2,060,604 | A | * | 11/1936 | Bartlett | ................ | B60K 5/1216 |
| | | | | | | 248/544 |
| 2,438,505 | A | * | 3/1948 | Hunt | .................... | A47B 96/061 |
| | | | | | | 108/152 |
| 2,865,167 | A | * | 12/1958 | Worobel | ................... | F02K 1/04 |
| | | | | | | 60/761 |

(Continued)

FOREIGN PATENT DOCUMENTS

| EP | 0898063 | 2/1999 |
| FR | 2926791 | 7/2009 |

(Continued)

OTHER PUBLICATIONS

French Search Report, dated Aug. 2, 2013.

*Primary Examiner* — Woody Lee, Jr.
*Assistant Examiner* — Joshua R Beebe
(74) *Attorney, Agent, or Firm* — Greer, Burns & Crain, Ltd.

(57) ABSTRACT

An aircraft nacelle comprising a first duct secured to an air intake and a second duct secured to a power plant. The two ducts are arranged end-to-end and connected by a connection. The connection comprises a bracket which extends between a first region for connecting to the power plant and a second region for connecting to the air intake, and which comprises a J-shaped profile in longitudinal planes, having at least one curved portion offset towards the outside of the nacelle with respect to the connecting regions.

15 Claims, 5 Drawing Sheets

(56) References Cited

U.S. PATENT DOCUMENTS

| | | | | |
|---|---|---|---|---|
| 6,123,170 | A * | 9/2000 | Porte | B64D 33/02 181/198 |
| 6,302,361 | B1 * | 10/2001 | Schaefer | H05K 5/0017 200/296 |
| 6,328,258 | B1 * | 12/2001 | Porte | B64D 29/06 244/53 B |
| 8,231,332 | B2 * | 7/2012 | Vauchel | B64D 33/02 244/53 R |
| 8,353,446 | B2 * | 1/2013 | Cox | A47G 29/1216 232/39 |
| 2005/0252195 | A1 * | 11/2005 | Porte | B64D 33/02 60/226.1 |
| 2008/0016844 | A1 * | 1/2008 | Shutrump | B64D 29/02 60/226.1 |
| 2009/0314921 | A1 * | 12/2009 | Gould | E05G 1/02 248/636 |
| 2010/0000227 | A1 | 1/2010 | Porte et al. | |
| 2010/0320316 | A1 | 12/2010 | Vauchel et al. | |
| 2011/0168839 | A1 * | 7/2011 | Porte | B64D 29/06 244/1 N |
| 2012/0006142 | A1 * | 1/2012 | Jung | B62D 1/189 74/493 |

FOREIGN PATENT DOCUMENTS

| | | | | |
|---|---|---|---|---|
| IT | WO 2012119638 A1 * | 9/2012 | | H04Q 1/02 |
| WO | 2008006959 | 1/2008 | | |

* cited by examiner

AIRCRAFT NACELLE COMPRISING A DEFORMABLE CONNECTION BETWEEN AN AIR INTAKE AND A POWER PLANT

CROSS-REFERENCES TO RELATED APPLICATIONS

This application claims the benefit of the French patent application No. 12 61169 filed on Nov. 23, 2012, the entire disclosures of which are incorporated herein by way of reference.

BACKGROUND OF THE INVENTION

The present invention relates to an aircraft nacelle comprising a deformable connection between an air intake and a power plant.

An aircraft propulsion assembly comprises a nacelle in which a power plant connected to the rest of the aircraft by means of a pylon is arranged, in a substantially concentric manner.

Figure 1:
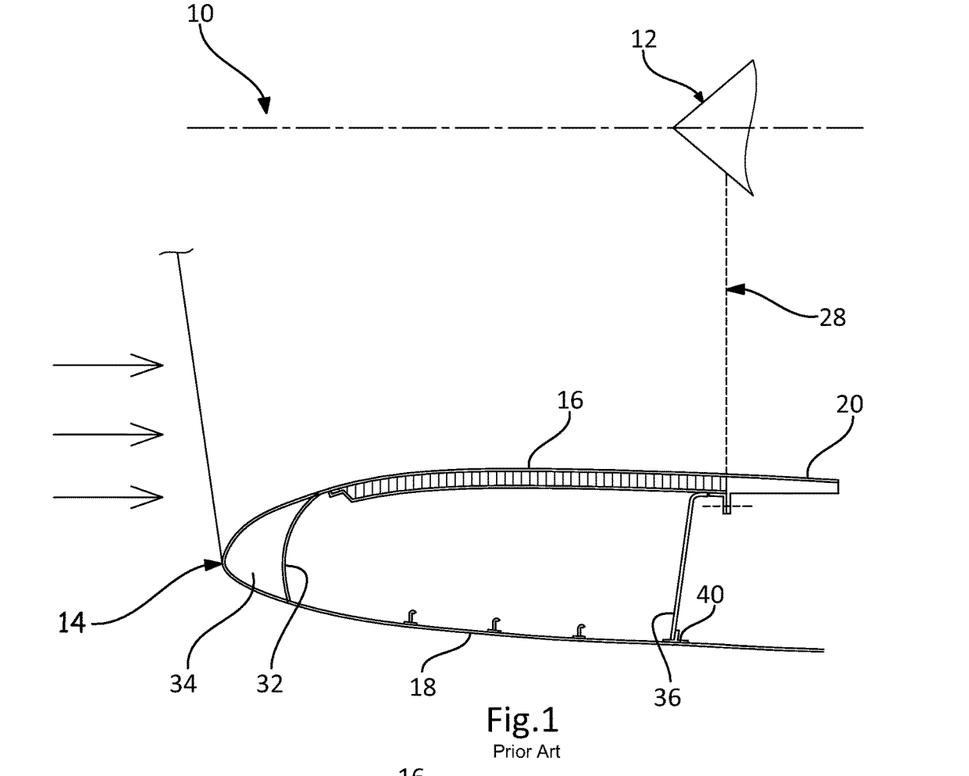
FIG. 1 is a cutaway of the lower, forward portion of an aircraft nacelle according to the prior art.

As shown in FIG. 1, the nacelle comprises, at the front, an air intake 10 by means of which an air flow can be channeled towards the power plant 12, wherein a first portion of the inflowing air, termed the primary flow, passes through the power plant in order to participate in combustion, and the second portion of the air flow, termed the secondary flow, is driven by a fan and flows in an annular duct delimited by the inner wall of the nacelle and the outer wall of the power plant.

For the remainder of the description, the longitudinal direction corresponds to the direction of the axis of rotation of the fan of the power plant.

The air intake 10 comprises a lip 14; that surface of the lip which is in contact with the aerodynamic flows extends, inside the nacelle, in the form of an inner duct 16 of substantially circular section and, outside the nacelle, in the form of an outer wall 18 of substantially circular section. The power plant comprises a duct 20 which may be arranged in the continuation of the inner duct 16.

Figure 2:
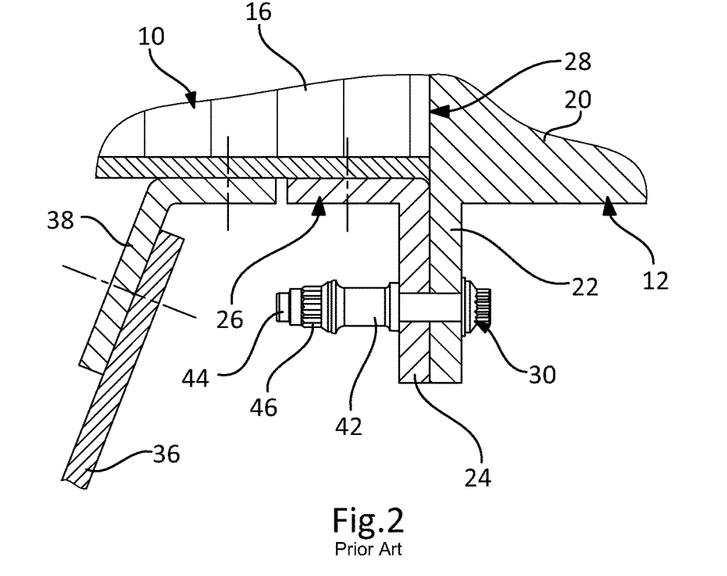
FIG. 2 is a cutaway showing, in detail, a connection between an air intake and a power plant according to the prior art.

As shown in FIG. 2, the air intake 10 is connected to the power plant 12 by a connection which comprises, at the level of the power plant, a first annular flange 22 secured to a second annular flange 24 of a panel which delimits the duct 16 or of an interposed part 26, termed bracket, connected to the panel which delimits the duct 16. The two flanges 22 and 24 are clamped against one another, at the level of a junction plane 28 which is substantially perpendicular to the longitudinal direction, and are held in that position by connecting elements 30, for example bolts or rivets, which pass through the flanges 22, 24 and extend parallel to the longitudinal direction.

In terms of structure, the air intake 10 comprises a first frame, termed the forward frame 32, which connects the inner duct 16 and the outer wall 18 delimiting, with the lip 14, an annular duct 34, and a second frame, termed the rear frame 36, which connects the inner duct 16 and the outer wall 18 close to the junction plane 28.

The rear frame, for its part, makes it possible to take up bending, rotational or other forces which act on the air intake such as, for example, the weight of the air intake and the forces induced by the aerodynamic flows.

According to one embodiment, the rear frame 36 is connected to the duct 16 either directly or via an interposed part or bracket 38 (shown in detail in FIG. 2) one leg of which is connected to the duct 16, the other leg being connected to the rear frame 36.

The rear frame 36 is connected to the outer wall 18 either directly or via a bracket 40 (shown in FIG. 1) having a T-shaped cross section, wherein the rear frame 36 is connected at the level of the foot of the T-shaped bracket, and wherein the head of the T presses against the inner face of the outer wall 18.

In the event of fan blades failing, the duct 20 of the power plant tends to undergo substantial deformation since it is designed to absorb, by deformation, the energy of the broken blades. At the level of the air intake, the inner duct 16 is made of a composite material and its mechanical properties are more limited than those of the duct 20 of the power plant, in particular in terms of bending strength.

In addition, in order to limit the risks of the panel or panels, which form the inner duct 16 of the air intake, coming loose, it is expedient to limit the spread of the deformations from the duct 20 of the power plant towards the inner duct 16 of the air intake.

To that end, a first solution consists in stiffening the rear frame and/or the connection between the air intake and the power plant so as to limit the spread of the deformations towards the inner duct 16 of the air intake.

Another solution consists in designing a rear frame and/or a connection between the air intake and the power plant which may deform so as to limit the spread of the deformations towards the inner duct 16 of the air intake.

SUMMARY OF THE INVENTION

The present invention relates more precisely to a deformable connection between the air intake and the power plant.

In order to limit the spread of the deformations of the annular flange 22 of the power plant towards the flange 24 of the air intake, it is possible to provide a filter at the level of the connecting elements 30. For every connecting element, this filter comprises at least one deformable sleeve 42 slipped onto the stem 44 of the connecting element 30, as shown in FIG. 2. This deformable sleeve 42 may be interposed between the annular flange 24 connected to the air intake and a nut 46 of the connecting element 30. This deformable sleeve 42 has an inside diameter adapted to that of the stem 44 and comprises in its central part a relatively small thickness so as to be able to deform, in particular by buckling. This arrangement makes it possible to increase the energy absorbed by deformation of the connecting element. It also makes it possible to limit the spread of deformations in the axial direction.

The present invention proposes an alternative or complementary solution that makes it possible to limit the spread of deformations between the power plant and the air intake by making use of the plastic deformation of the connection between the power plant and the air intake.

To that end, the subject of the invention is an aircraft nacelle comprising a first duct secured to an air intake and a second duct secured to a power plant, the two ducts being arranged end-to-end and connected by a connection, said nacelle being characterized in that the connection comprises a bracket which extends between a first region for connecting to the power plant and a second region for connecting to the air intake, and which comprises a J-shaped profile in longitudinal planes, having at least one curved portion offset towards the outside of the nacelle with respect to the connecting regions.

On account of the curved portion and its capacity to deform plastically above certain forces, the bracket can deform and act as a filter for any deformations which have limited spread in the direction of the air intake.

BRIEF DESCRIPTION OF THE DRAWINGS

Further features and advantages will become apparent from the following description of the invention, this description being given only by way of example, with reference to the appended drawings, in which.

DETAILED DESCRIPTION OF THE PREFERRED EMBODIMENTS

As in the prior art, an aircraft nacelle according to the invention comprises at the front an air intake 50 having an inner duct 52 by means of which a flow of air can be channeled towards a power plant 54. The latter comprises a duct 56 which may be arranged in the continuation of the inner duct 52. The ducts 52 and 56 abut at a junction plane 58 which is substantially perpendicular to the longitudinal direction.

For the remainder of the description, a longitudinal plane is understood to be a plane containing the longitudinal direction. A transverse plane corresponds to a plane perpendicular to the longitudinal direction.

A radial direction is a direction perpendicular to the longitudinal direction.

An element A is offset towards the outside with respect to an element B when the distance which separates the element A from the longitudinal axis of the nacelle is greater than the distance which separates the element B from the longitudinal axis of the nacelle.

The air intake 50 is connected to the power plant 54 by a connection which comprises a first annular flange 60 secured to the duct 56 of the power plant, which provides a support surface 62 corresponding to the junction plane 58.

According to the invention, the connection between the power plant and the air intake comprises a bracket 64 which extends between a first region 66 for connecting to the power plant 54 and a second region 68 for connecting to the air intake 50, and which comprises a profile in longitudinal planes, having at least one curved portion 70 with, on either side, a first branch 72 connected to the power plant 54 in the first connecting region 66 and a second branch 74 connected to the air intake 50, the curved portion 70 being offset towards the outside of the nacelle with respect to the connecting regions 66 and 68.

The curved portion 70 comprises at least one radius of curvature, the centre of the radius of curvature being oriented towards the interior of the nacelle. When the curved portion comprises several radii of curvature, all of the centers are oriented towards the interior of the nacelle.

Figure 3A:
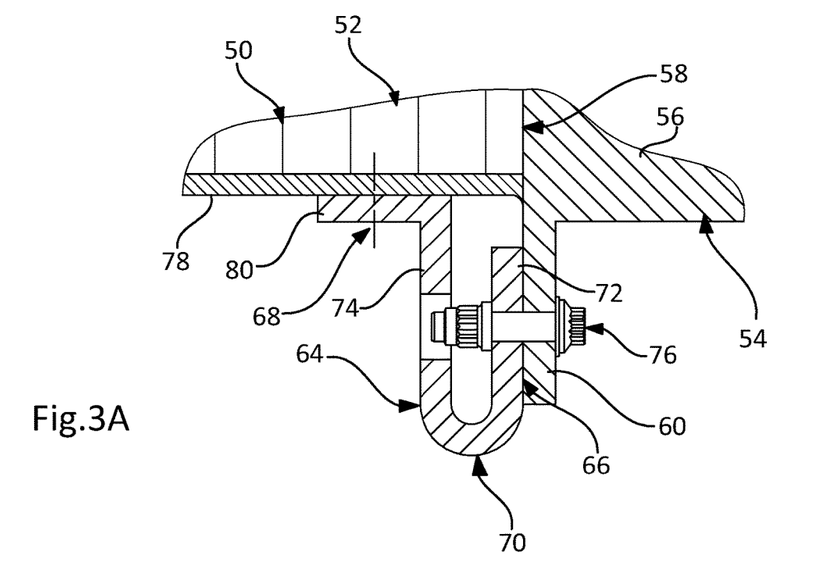
FIG. 3A is a cutaway showing, in detail, a connection between an air intake and a power plant according to a first variant of the invention.
Figure 3B:
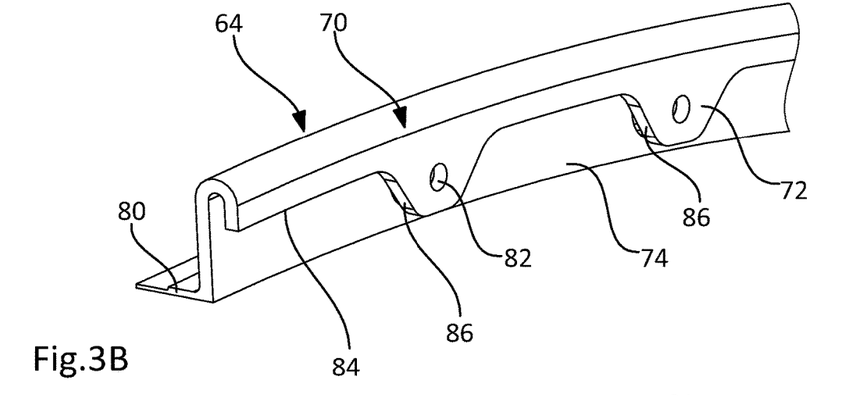
FIG. 3B is a perspective view in a first direction of a part of the connection shown in FIG. 3A.
Figure 3C:
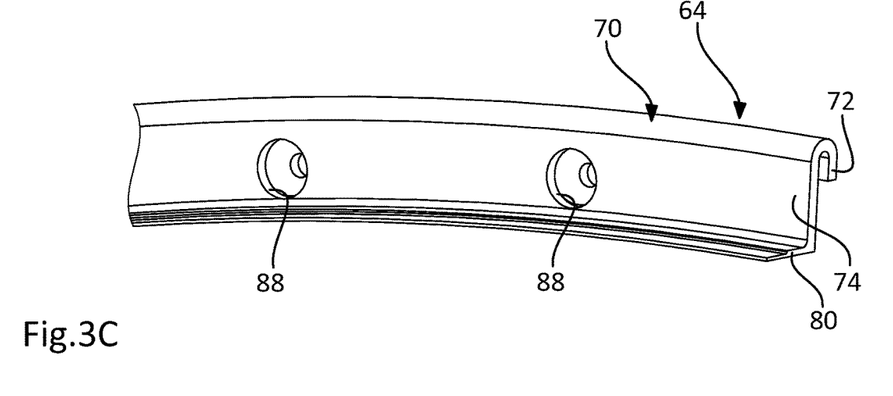
FIG. 3C is a perspective view in a second direction of a part of the connection shown in FIG. 3A.
Figure 4A:
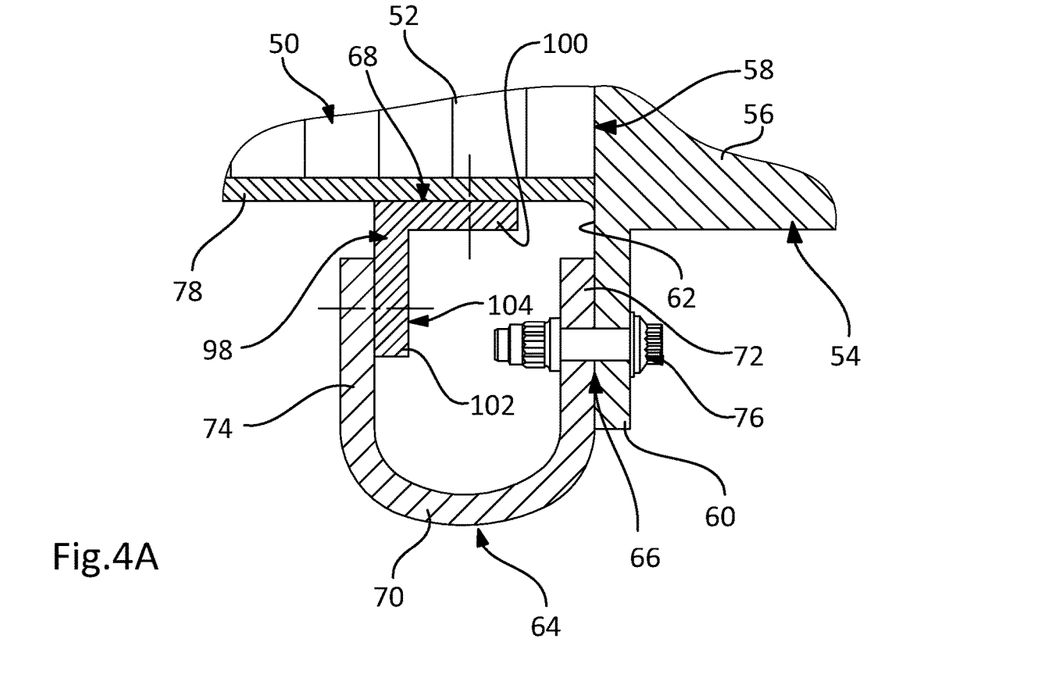
FIG. 4A is a cutaway showing, in detail, a connection between an air intake and a power plant according to a second variant of the invention.
Figure 4B:
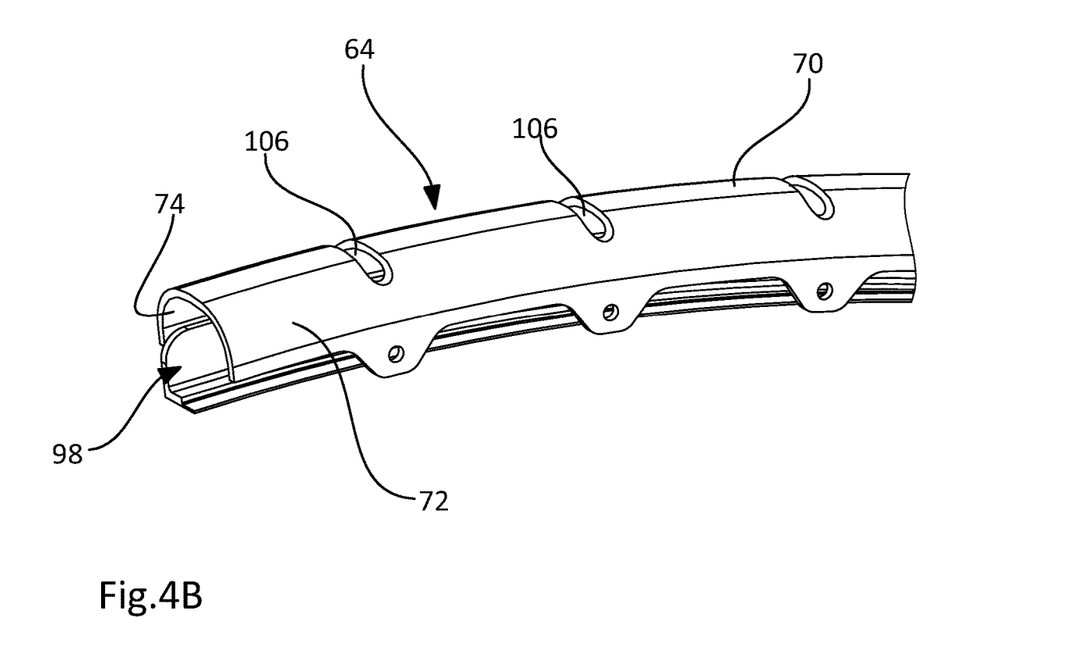
FIG. 4B is a perspective view of a part of the connection shown in FIG. 4A.

According to certain embodiments, the branches 72 and 74 have the same lengths and are approximately parallel. In this case, the bracket 64 has a U-shaped profile, as shown in FIGS. 4A and 4B. According to certain embodiments, the branches 72 and 74 have different lengths. In this case, the bracket 64 has a J-shaped profile, as shown in FIGS. 3A to 3C. However, other profiles may be envisaged, as shown in FIGS. 5A, 5B, 6A and 6B.

On account of the curved portion 70 and its capacity to deform plastically above certain forces, the branches 72 and 74 can move with respect to one another in a radial direction, or can move with respect to one another in the longitudinal direction. These deformations in the connection between the air intake and the power plant make it possible to absorb a part of the energy generated by the impact of a broken blade against the duct 54 of the power plant, and this makes it possible to limit the spread of deformations in the longitudinal and/or radial directions from the duct of the power plant towards the duct of the air intake.

Advantageously, this bracket 64 does not have an articulation, thereby making it possible for the bracket to deform plastically in order to absorb a part of the energy generated by the impact.

According to one embodiment, the first branch 72 is kept clamped against the support surface 62 of the flange 60 of the power plant by means of connecting elements 76 distributed along the circumference of said flange 60. These connecting elements 76 are not described in more detail since they can be identical to those of the prior art that make it possible to connect the flanges of the air intake and of the power plant.

The connection between the air intake and the power plant may comprise one or more brackets.

In the case of one bracket, the latter may extend over the entire circumference of the ducts 52 and 56.

Figure 6A:
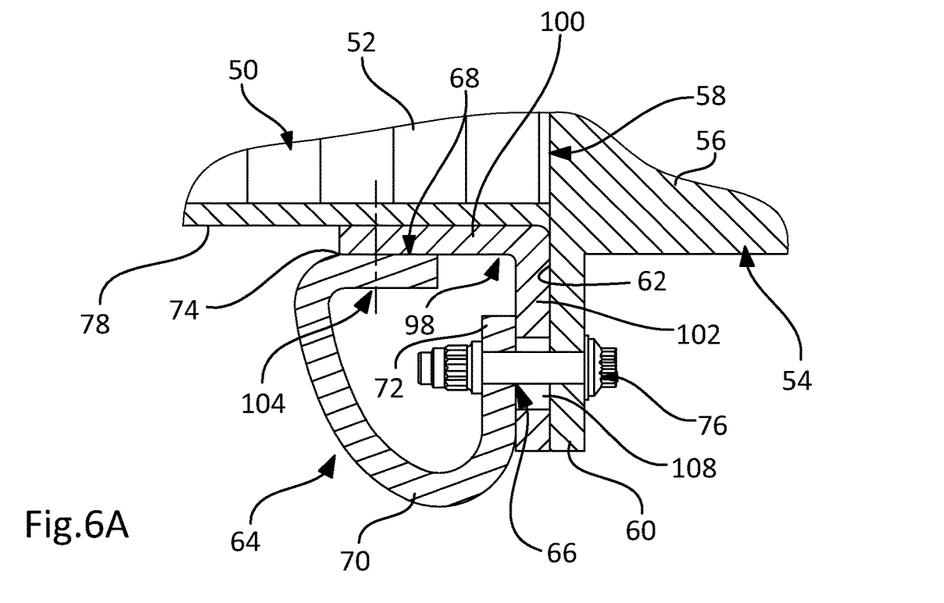
FIG. 6A is a cutaway showing, in detail, a connection between an air intake and a power plant according to a fourth variant of the invention.
Figure 6B:
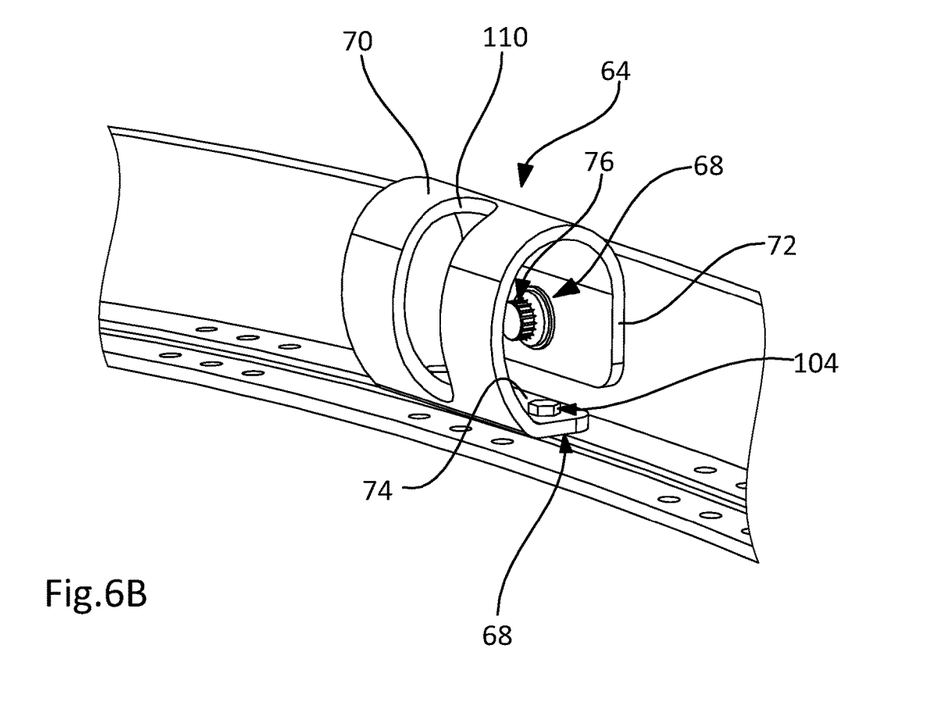
FIG. 6B is a perspective view of a part of the connection shown in FIG. 6A.

In the case of several brackets, the latter may be jointed and extend over the entire circumference of the ducts 52 and 56. As a variant, as shown in FIGS. 6A and 6B, the brackets 64 can be separate and be distributed over the entire circumference of the ducts 52 and 56.

According to certain variants, the bracket 64 is connected directly to the inner duct 52, as shown in FIGS. 3A, 3B, 3C, 5A and 5B.

According to a first variant shown in FIGS. 3A, 3B and 3C, the inner duct 52 comprises a cylindrical outer surface 78. The bracket 64 comprises a cylindrical portion 80 connected to the free end of the second branch 74.

This cylindrical portion 80 has a cylindrical inner surface having a diameter identical to that of the outer surface 78 of the inner duct 52. The cylindrical portion 80 is connected to the inner duct 52 by any appropriate means, for example blind rivets.

According to one embodiment, the two branches 72 and 74 are parallel and the cylindrical portion 80 is perpendiculaire to the branch 74.

The first branch 72 comprises orifices 82 (shown in FIGS. 3A and 3B) having a diameter approximately equal, disregarding assembly clearances, to that of the stems of the connecting elements 76. Between the orifices, the lower edge 84 of the first branch 72 is offset towards the outside with respect to the axes of the orifices 82 and comprises for every orifice 82 a projecting form in the form of a lobe 86, as shown in FIG. 3B.

The second branch 74 comprises orifices 88 that are coaxial with the orifices 82, the diameters of the orifices 88 being greater than the diameters of the orifices 82 so as to make it possible to introduce the connecting elements 76 and to insert a tool in order to install the connecting elements 76, as shown in FIGS. 3A and 3C.

Figure 5A:
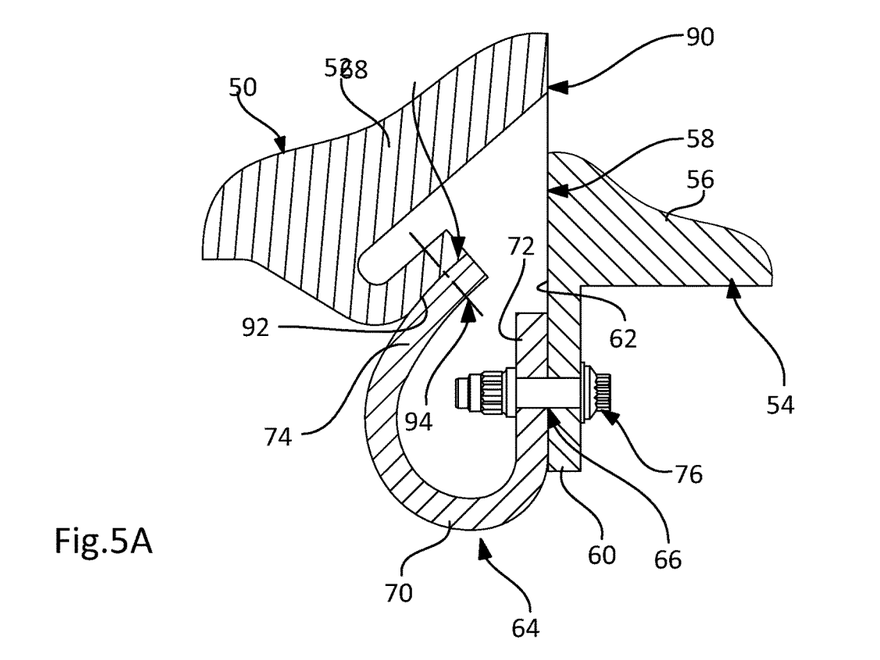
FIG. 5A is a cutaway showing, in detail, a connection between an air intake and a power plant according to a third variant of the invention.
Figure 5B:
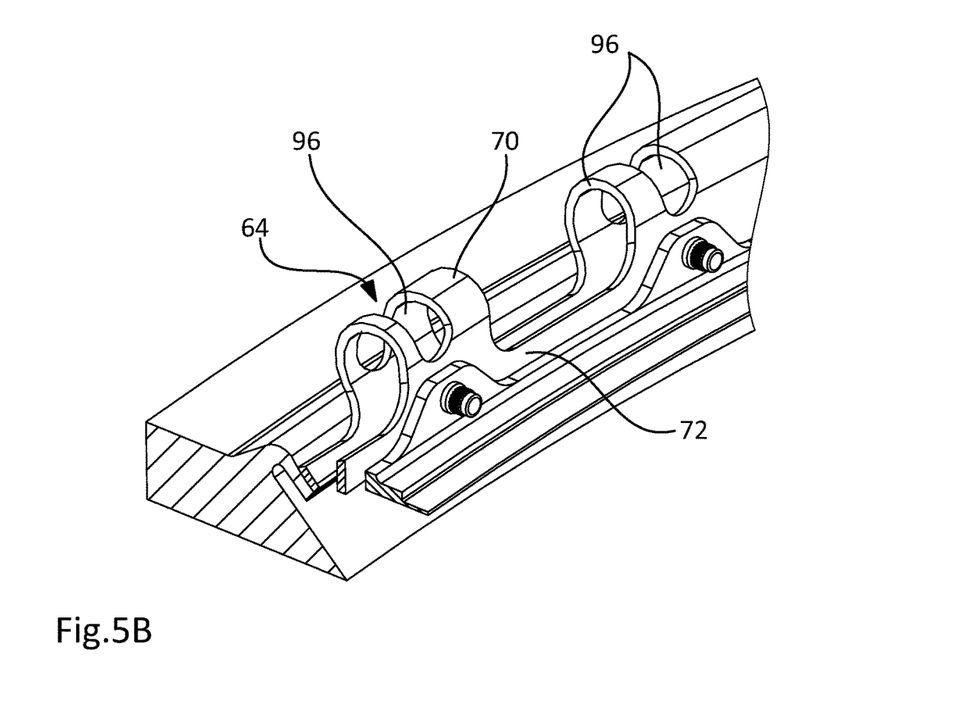
FIG. 5B is a perspective view of a part of the connection shown in FIG. 5A.

According to another variant, shown in FIGS. 5A and 5B, the edge 90 of the inner duct 52 comprises an inclined flat 92, against which the second branch 74 of the bracket 64 is clamped. The second branch is connected to the inner duct by connecting elements 94, such as rivets or bolts, for example.

As shown in FIG. 5B, the bracket 64 comprises, in the region of the curved portion 70, orifices 96 that make it possible to install the connecting elements 76 and 94.

According to further variants shown in FIGS. 4A, 4B, 6A and 6B, the bracket 64 is connected to the inner duct 52 by means of a second bracket 98. As for the variant shown in FIGS. 3A to 3C, the inner duct comprises a cylindrical outer surface 78.

The second bracket 98 has an L-shaped profile having a cylindrical first leg 100 fixed to the inner duct 52 by any appropriate means, such as blind rivets, for example, and a second leg 102 which extends in a transverse plane and to which the second branch 74 of the bracket 64 is connected by connecting elements 104 (which may be identical to the connecting elements 76).

According to a variant shown in FIGS. 4A and 4B, the second leg 102 is spaced apart from the junction plane 58. In this case, the bracket comprises orifices 106 that make it possible to install the connecting elements 76 and 104.

According to one embodiment, the branches 72 and 74 of the bracket have the same length. Preferably, the lower edges of the branches 72 and 74 comprise projecting forms in the form of lobes, each of them comprising an orifice to allow the passage of the stems of the connecting elements 76 and 104.

According to a final variant shown in FIGS. 6A and 6B, the second leg 102 is interposed between the first branch 72 of the bracket 64 and the first flange 60 of the power plant. For every connecting element 76, the second leg 102 comprises an orifice 108 having a diameter greater than that of the stems of the connecting elements 76 so as to allow said stems to move in the orifices 108 in a transverse plane. According to this arrangement, the first branch 72 of the bracket 64 is unable to move with respect to the first flange 60 of the power plant, whereas the second leg 102 of the second bracket is able to move in a transverse plane with respect to the first flange 60 of the power plant.

The second branch 74 of the bracket 64 is clamped against the first leg 100 of the second bracket 98 by connecting elements. Certain connecting elements 104 can fix the second branch 74 and the first leg 100 to the inner duct 52.

According to this variant, one bracket 64 is provided for one connecting element 76. Advantageously, one distinct bracket 64 is provided for every connecting element 76.

According to one embodiment, the curved portion 70 of the bracket 64 comprises an orifice 110 that makes it possible to install the corresponding connecting element 76.

The variant shown in FIGS. 6A and 6B makes it possible to limit the spread of deformations in the radial direction. In addition, every connecting element 76 may comprise a sleeve, as shown in FIG. 2, in order to absorb the deformations in the longitudinal direction.

Advantageously, regardless of the embodiment, the connection between the air intake and the power plant comprises several separate brackets 64 distributed over the circumference of the ducts 52, 56 so as to encourage radial deformations.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft nacelle comprising:
a first duct secured to an air intake and
a second duct secured to a power plant,
the two ducts being arranged end-to-end and abutting at a junction plane and connected by a connection,
the connection comprising a bracket which extends between a first region for connecting to the power plant and a second region for connecting to the air intake, and having, in a longitudinal plane, at least one curved portion offset towards the outside of the nacelle with respect to the connecting regions and a first branch comprising a plurality of first orifices, the first branch being parallel to the junction plane which is secured to an annular flange extending along the junction plane of the power plant by means of connecting elements distributed along a circumference of said annular flange, wherein the connecting elements pass through the junction plane at a first orifice in the first branch, and, wherein the bracket further comprises a plurality of second orifices arranged to allow the connecting elements to be installed in the first orifices.

2. The aircraft nacelle according to claim 1, wherein the bracket comprises a second branch connected directly to the first duct of the air intake.

3. The aircraft nacelle according to claim 2, wherein the bracket comprises a second branch extended by a perpendicular cylindrical portion connected to the first duct of the air intake.

4. The aircraft nacelle according to claim 3, wherein the first orifices have a diameter approximately equal, disregarding assembly clearances, to that of the stems of the connecting elements, and the second orifices being coaxial with the first orifices, the diameters of the second orifices being greater than the diameters of the first orifices.

5. The aircraft nacelle according to claim 2, wherein the first duct comprises an inclined flat, against which the second branch of the bracket is clamped.

6. The aircraft nacelle according to claim 5, wherein the curved portion of the bracket comprises orifices that make it possible to install the connecting elements.

7. The aircraft nacelle according to claim 1, wherein the bracket is connected to the first duct of the air intake by means of a second bracket.

8. The aircraft nacelle according to claim 7, wherein the second bracket has an L-shaped profile having a first leg fixed to the first duct and a second leg which extends in a transverse plane and to which a second branch of the bracket is connected.

9. The aircraft nacelle according to claim 8, wherein the second leg is spaced apart from the annular flange of the power plant.

10. The aircraft nacelle according to claim 9, wherein the bracket comprises orifices that make it possible to install the connecting elements.

11. The aircraft nacelle according to claim 7, wherein the second bracket has a first leg fixed to the first duct and a second leg is interposed between the first branch of the bracket and the annular flange of the power plant and comprises, for every connecting element, an orifice having a diameter greater than that of the stems of the connecting elements so as to allow said stems to move in the orifices in a transverse plane.

12. The aircraft nacelle according to claim 11, wherein the connection between the air intake and the power plant comprises several separate brackets distributed over the circumference of the ducts.

13. The aircraft nacelle according to claim 1, wherein the connection between the air intake and the power plant comprises several separate brackets distributed over the circumference of the ducts.

14. The aircraft nacelle according to claim 1 wherein the bracket comprises a J-shaped profile in the longitudinal plane.

15. An aircraft nacelle comprising:
a first duct secured to an air intake and
a second duct secured to a power plant having an annular flange, wherein the two ducts abut at a junction plane and wherein the annular flange extends along the junction plane, and,
a bracket which extends between a first branch connected to the annular flange and a second branch secured to the air intake, and having, in a longitudinal plane, at least one curved portion offset towards the outside of the nacelle with respect to the branches such that the branches can move with respect to each other in both a radial direction and a horizontal direction,
wherein the first branch comprises a plurality of first orifices, and
wherein the bracket further comprises a plurality of second orifices arranged to allow the connecting elements to be installed in the first orifices.

* * * * *